United States Patent
Cui et al.

(10) Patent No.: US 11,012,875 B2
(45) Date of Patent: *May 18, 2021

(54) METHOD AND SYSTEM TO DYNAMICALLY ENABLE SDN NETWORK LEARNING CAPABILITY IN A USER-DEFINED CLOUD NETWORK

(71) Applicant: AT&T Intellectual Property I, L.P., Atlanta, GA (US)

(72) Inventors: Zhi Cui, Sugar Hill, GA (US); Sangar Dowlatkhah, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 168 days.

This patent is subject to a terminal disclaimer.

(21) Appl. No.: 16/436,103

(22) Filed: Jun. 10, 2019

(65) Prior Publication Data

US 2019/0294996 A1 Sep. 26, 2019

Related U.S. Application Data

(63) Continuation of application No. 15/059,768, filed on Mar. 3, 2016, now Pat. No. 10,360,514.

(51) Int. Cl.
*H04W 24/08* (2009.01)
*G06N 20/00* (2019.01)
(Continued)

(52) U.S. Cl.
CPC ............ *H04W 24/08* (2013.01); *G06N 20/00* (2019.01); *H04L 41/0896* (2013.01); *H04L 43/0876* (2013.01)

(58) Field of Classification Search
None
See application file for complete search history.

(56) References Cited

U.S. PATENT DOCUMENTS 7,500,158 B1 3/2009 Smith et al.
8,811,172 B1 8/2014 Sella
(Continued)

FOREIGN PATENT DOCUMENTS

CN 104486194 A 4/2015
KR 101541531 B1 8/2015
(Continued)

OTHER PUBLICATIONS

Nam, Hyunwoo, et al., "Towards QoE-aware video streaming using SDN," Global Communications Conference (GLOBECOM), 2014 IEEE, IEEE, 2014. (http://www.cs.columbia.edu/~hn2203/papers/4_globecom_2014.pdf.
(Continued)

*Primary Examiner* — Kodzovi Acolatse
*Assistant Examiner* — The Hy Nguyen
(74) *Attorney, Agent, or Firm* — BakerHostetler

(57) ABSTRACT

A software defined network controller for controlling a radio access network has a leaning capability by which usage characteristics are learned for each service provided by the radio access network. For example, bandwidth data, connection duration data and latency data may be used to learn usage characteristics for each radio access network service. The learned usage characteristics are then used in allocating network resources in response to a service request.

20 Claims, 4 Drawing Sheets

(51) Int. Cl.
*H04L 12/26* (2006.01)
*H04L 12/24* (2006.01)

(56) References Cited

U.S. PATENT DOCUMENTS

| | | | |
|---|---|---|---|
| 9,015,212 | B2 | 4/2015 | David et al. |
| 9,088,803 | B2 | 7/2015 | Li et al. |
| 2012/0058742 | A1 | 3/2012 | Razoumov |
| 2013/0250770 | A1 | 9/2013 | Zou et al. |
| 2013/0329601 | A1 | 12/2013 | Yin et al. |
| 2014/0173018 | A1 | 6/2014 | Westphal et al. |
| 2014/0192645 | A1 | 6/2014 | Zhang et al. |
| 2015/0055623 | A1 | 2/2015 | Li et al. |
| 2015/0063112 | A1 | 3/2015 | Wu et al. |
| 2015/0124583 | A1 | 5/2015 | May et al. |
| 2015/0124625 | A1 | 5/2015 | Aldrin et al. |
| 2015/0163152 | A1 | 6/2015 | Li |
| 2015/0163162 | A1 | 6/2015 | DeCusatis et al. |
| 2015/0200838 | A1 | 7/2015 | Nadeau et al. |
| 2015/0381515 | A1 | 12/2015 | Mattson |
| 2016/0218948 | A1 | 7/2016 | Djukic |
| 2016/0300153 | A1 | 10/2016 | Verma |
| 2016/0379125 | A1* | 12/2016 | Bordawekar .......... G06N 7/005 706/12 |
| 2017/0093750 | A1 | 3/2017 | McBride |
| 2017/0250875 | A1* | 8/2017 | Jensen ................ H04L 43/0829 |

FOREIGN PATENT DOCUMENTS

| | | |
|---|---|---|
| WO | 2015026785 A2 | 2/2015 |
| WO | 2015070909 A1 | 5/2015 |
| WO | 2015174988 A1 | 11/2015 |

OTHER PUBLICATIONS

Velrajan, Saro, "Application-Aware Routing in Software-Defined Networks," Aricent, aricent.com, 2013. (https://www.aricent.com/pdf/Aricent_Whitepaper_-_Application_Aware_Routing_in_SDN.pdf.

Ramakrishnan, Sangeeta, "An SDN Based Approach to Measuring and Optimizing ABR Video Quality of Experience," Standford Univ., wsw3.stanford.edu, accessed: Nov. 2015. http://msw3.stanford.edu/~zhuxq/papers/ncta2014.pdf.

Govindarajan, Kannan, et al., "Realizing the Quality of Service (QoS) in Software-Defined Networking (SDN) based Cloud infrastructure," Information and Communication Technology (ICoICT), 2014 2nd International Conference, IEEE, 2014. http://ieeexplore.ieee.org/xpl/articleDetails.jsp?arnumber=6914113.

"Quick Reference Guide: 6 Reasons to Consider SDN for Campus Networks," Brocade Communication Systems, Inc., kimgusta.com, 2014. http://kimgusta.com/uploads/images/6_Reasons_to_Consider_SDN_for_Campus_Networks.pdf.

Mijumbi, Rashid, et aL, "A neuro-fuzzy approach to self-management of virtual network resources," Expert Systems with Applications 42.3 (2015): 1376-1390. http://www.maps.upc.edu/rashid/files/rmijumbi-eswa-2014.pdf.

* cited by examiner

METHOD AND SYSTEM TO DYNAMICALLY ENABLE SDN NETWORK LEARNING CAPABILITY IN A USER-DEFINED CLOUD NETWORK

CROSS-REFERENCE TO RELATED APPLICATIONS

This application is a continuation of co-pending application Ser. No. 15/059,768, entitled "METHOD AND SYSTEM TO DYNAMICALLY ENABLE SDN NETWORK LEARNING CAPABILITY IN A USER-DEFINED CLOUD NETWORK," filed on Mar. 3, 2016, the contents of which are hereby incorporated by reference herein in their entirety.

TECHNICAL FIELD

Embodiments of the present disclosure relate to user-defined cloud networks. Specifically, the disclosure relates to the use of an enhanced software-defined-network controller to improve utilization of radio access network resources.

BACKGROUND

The software defined network (SDN) concept allows a separation of the control plane from the user or application plane in a communications network. The concept allows the management of network services through abstraction of higher-level functionality. An SDN controller is a logically centralized entity that performs several operations. Those operations include translating the requirements from the SDN application layer down to the SDN datapath or infrastructure layer. The operations further comprise providing the SDN applications with an abstract view of the network (which may include statistics and events). An SDN controller can be leveraged for many enhanced capabilities.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EXEMPLARY EMBODIMENTS

Figure 1:
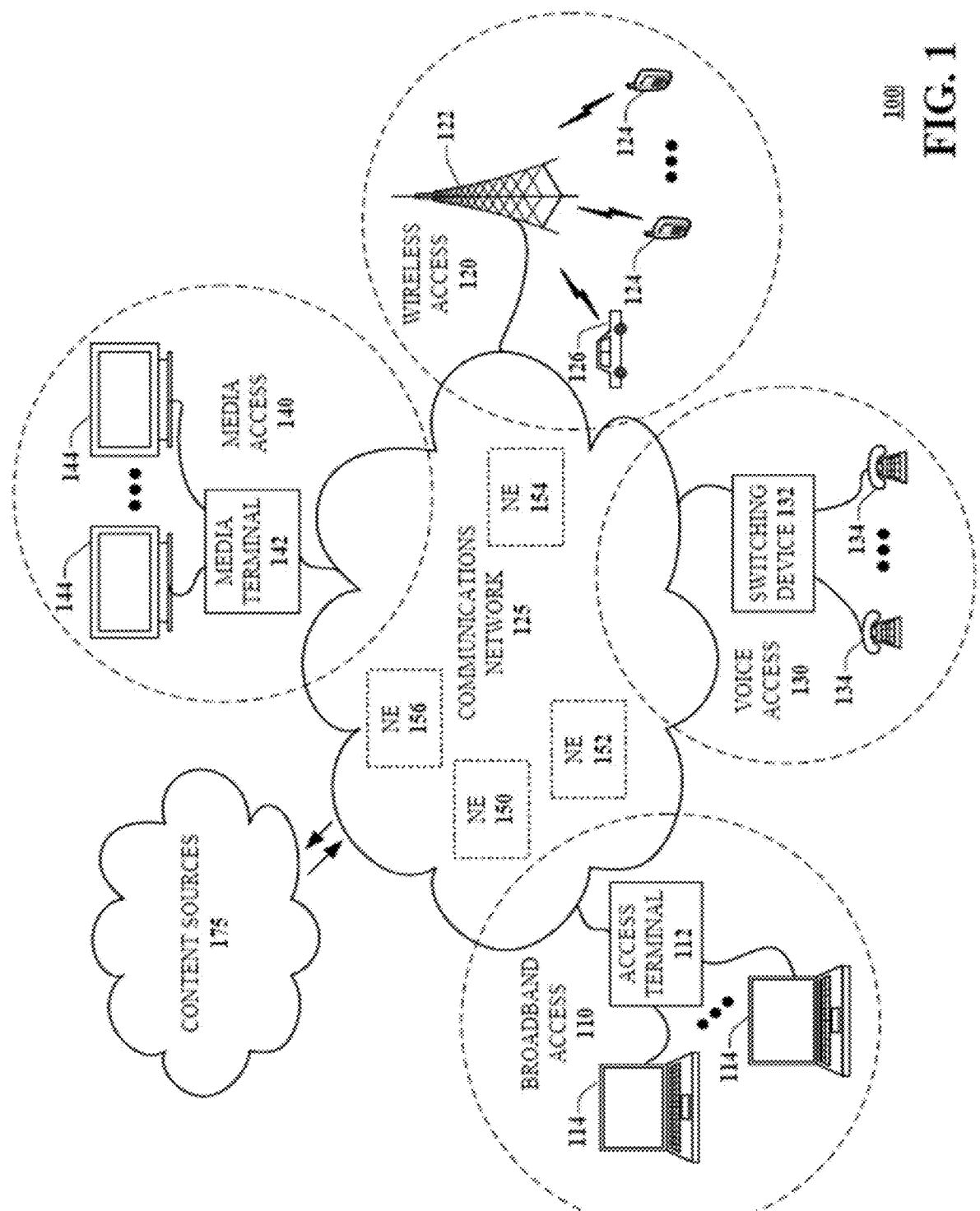
FIG. 1 is a block diagram showing a communications network in accordance with aspects of the present disclosure.

In the presently described application, the SDN controller is enhanced with network learning capability to efficiently and intelligently utilize network resources in a radio access network (RAN). To that end, the SDN controller may incorporate learning capabilities that include, for example, how much bandwidth a streaming video requires for a particular service, what are the other plays into latency and efficiency, and what is the traffic pattern and trend of streaming in the network for that particular service. Intelligent data collection, either from the network or from user devices, is performed and a database is maintained either at the RAN SDN controller level or in the RAN data plane application level that can feed back to the SDN controller. The SDN controller can leverage the learned network and service behavior for more intelligent network control of the RAN.

Embodiments of the present disclosure include a software defined network controller having an interface with a database store with radio access network usage data for each of a plurality of radio access network services provided on a radio access network. The controller includes an intelligent data collection function configured for collecting the radio access network usage data from a core network of the radio access network on a per-flow basis for each of the plurality of radio access network services, and for storing the radio access network usage data in the database store.

The SDN controller further includes a network resource allocation engine comprising an interface with the database store, a processor and at least one memory device storing computer readable instructions that, when executed by the processor, cause the processor to execute operations comprising: for each of the plurality of radio access network services, applying a learning algorithm to determine learned network usage requirements based on the radio access network usage data; and allocating resources per service of the radio access network based on the learned usage requirements of each service and based on bandwidth and latency requirements computed from service requirements.

In further embodiments of the disclosure, a method for allocating resources in a radio access network using a software defined network controller comprises the following operations. Radio access network usage data is collected from a core network of the radio access network for each of a plurality of radio access network services provided on the radio access network, the radio access network usage data being on a per-flow basis for each of the plurality of radio access network services. Bandwidth and latency requirements are computed from service requirements for each of the plurality of radio access network services. For each of the plurality of radio access network services, a learning algorithm is applied to determine learned network usage requirements based on the radio access network usage data. Resources are then allocated per service of the radio access network based on the learned usage requirements of each service and based on the bandwidth and latency requirements.

In further embodiments of the disclosure, a computer-readable storage device has stored thereon computer readable instructions for allocating resources in a radio access network using a software defined network controller. Execution of the computer readable instructions by a processor causes the processor to perform operations comprising: collecting, from a core network of the radio access network, radio access network usage data for each of a plurality of radio access network services provided on the radio access network, the radio access network usage data being on a per-flow basis for each of the plurality of radio access network services; computing bandwidth and latency requirements from service requirements for each of the plurality of radio access network services; for each of the plurality of radio access network services, applying a learning algorithm to determine learned network usage requirements based on the radio access network usage data; and allocating resources per service of the radio access network based on the learned usage requirements of each service and based on the bandwidth and latency requirements.

The presently disclosed concepts may be implemented to improve efficiencies, capacity and user experience of a radio access network within a communications network environment. Such a communications network in accordance with various aspects described herein is illustrated by the block diagram 100 shown in FIG. 1. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text or other media. While broadband access 110, wireless access 120, voice access 130 and media access 140 are shown separately, one or more of these forms of access can be combined to provide multiple access services to a single client device.

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched telephone network, a voice over Internet protocol (VoIP) network, Internet protocol (IP) based television network, a cable network, a passive or active optical network, a 4G or higher wireless radio access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G or higher modem, an optical modem and/or other access devices.

In various embodiments, the base station or access point 122 can include a 4G or higher base station in a radio access network, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2:
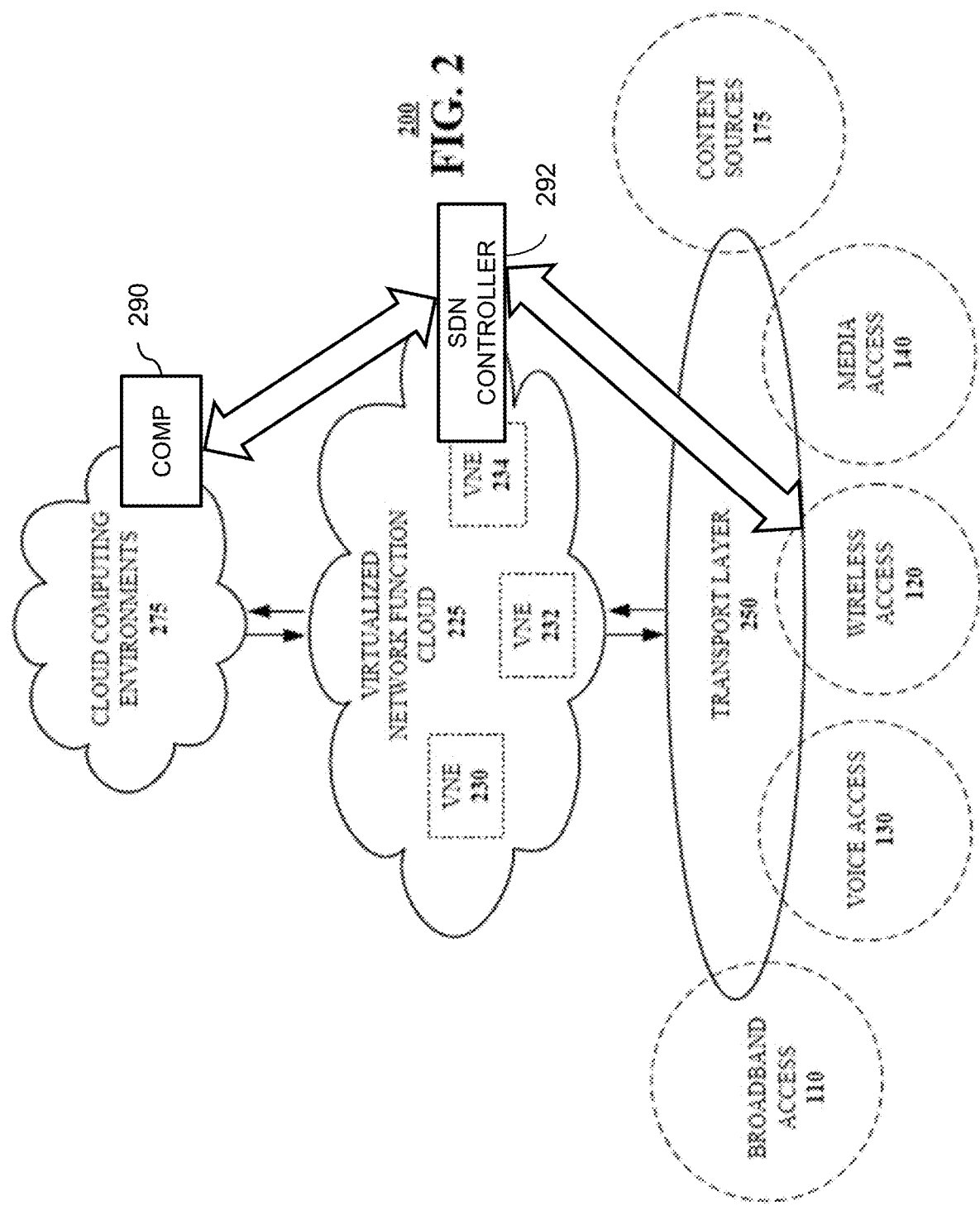
FIG. 2 is a block diagram showing a virtualized communications network in accordance with aspects of the present disclosure.

Referring now to FIG. 2, a block diagram 200 illustrating an example, non-limiting embodiment of a virtualized communication network in accordance with various aspects described herein, is shown. In particular, a virtualized communication network is presented that can be used to implement some or all of the communications network 125 presented in conjunction with FIG. 1.

In particular, a cloud networking architecture is shown that leverages cloud technologies and supports rapid innovation and scalability via a transport layer 250, virtualized network function cloud 225 and/or one or more cloud computing environments 275. In various embodiments, this cloud networking architecture is an open architecture that leverages application programming interfaces (APIs), reduces complexity from services and operations; supports more nimble business models and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 230, 232, 234, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrate. The most typical type of substrate being servers that support Network Function Virtualization (NFV), followed by packet forwarding capabilities based on generic computing resources, with specialized network technologies brought to bear when general purpose processors or merchant silicon are not appropriate. In this case, communication services can be implemented as cloud-centric workloads.

As an example, a traditional network element 150, such as a radio access network element can be implemented via a virtual network element 234 composed of NFV software modules, merchant silicon, and associated controllers such as the software defined network controller 292. The software can be written so that increasing workload consumes incremental resources from a common resource pool, and moreover so that it is elastic: so the resources are only consumed when needed. In a similar fashion, other network elements such as other routers, switches, edge caches, and middleboxes are instantiated from the common resource pool. Such sharing of infrastructure across a broad set of uses makes planning and growing that infrastructure easier to manage.

In an embodiment, the transport layer 250 includes fiber, cable, wired and/or wireless transport elements, network elements and interfaces to provide broadband access 110, wireless radio access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 230, 232 or 234. These network elements can be included in transport layer 250. For example, a radio access network providing wireless access 120 may comprise a plurality of cellular base stations 122 interconnected by a backhaul infrastructure. Those physical layer elements do not lend themselves to abstraction and are therefore included in the transport layer 250. They communicate with the SDN controller using an SDN protocol such as the OpenFlow™ protocol.

The virtualized network function cloud 225 interfaces with the transport layer 250 to provide the virtual network elements 230, 232, 234, etc. to provide specific NFVs. In particular, the virtualized network function cloud 225 leverages cloud operations, applications, and architectures to support networking workloads. The virtualized network elements 230, 232 and 234 can employ network function software that provides either a one-for-one mapping of traditional network element function or alternately some combination of network functions designed for cloud computing. For example, virtualized network elements 230, 232 and 234 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large aggregates of traffic, their workload can be distributed across a number of servers—each of which adds a portion of the capability, and overall which creates an elastic function with higher availability than its former monolithic version. These virtual network elements 230, 232, 234, etc. can be instantiated and managed using an orchestration approach similar to those used in cloud compute services.

The cloud computing environments 275 can interface with the virtualized network function cloud 225 via APIs that expose functional capabilities of the VNE 230, 232, 234, etc. to provide the flexible and expanded capabilities to the virtualized network function cloud 225. In particular, network workloads may have applications distributed across the virtualized network function cloud 225 and cloud computing environment 275 and in the commercial cloud, or might simply orchestrate workloads supported entirely in NFV infrastructure from these third party locations. In one example, a control, orchestrator management and policy server 290 interfaces with the SDN controller 292 to oversee orchestration, control and policy management of the wireless radio access 120.

In the present disclosure, a network learning capability is implemented in the SDN controller 292 to efficiently and intelligently utilize network resources in a RAN. Mobile traffic has been growing at a very fast pace and the trend is continuing. In addition, the divergence of radio technologies, types of devices, and service requirements are all widening. For example, smart mobile devices requiring enhanced mobile broadband have become ubiquitous in many areas of the world. Concurrently, the Internet of things (IoT) is expected to continue its extreme growth. That growth will result in a massive number of sensor nodes with low bandwidth and relaxed latency requirements. Other communications requiring ultra-reliability and low latency, such as the connected car, have also grown rapidly.

To meet those divergent requirements, mobile service providers are actively looking for ways to improve network efficiency, system capacity and end user experience. The providers are developing new, more efficient technologies, such as 5G. At the same time, network resources are being sliced for different types of services to allow all services to share the same network resources. Mobile service providers are additionally attempting to select the most suitable radio technologies for a given service.

Many data collection mechanisms are available to network operators for collecting data such as network load conditions. The present describes the use of a learning capability for each RAN service, such as for each streaming video service (movies on demand, video telecommunications, etc.). That learning capability determines network characteristics of each service, such as the bandwidth a streaming video service requires, the other requirements the streaming video service has, such as latency and preferred codec, and the traffic pattern and trend of the streaming in the network. Those network characteristics of each service are used in proactively making network resource allocation decisions. That capability allows a more dynamic network slicing decision to best utilize the limited RAN resources.

Figure 3:
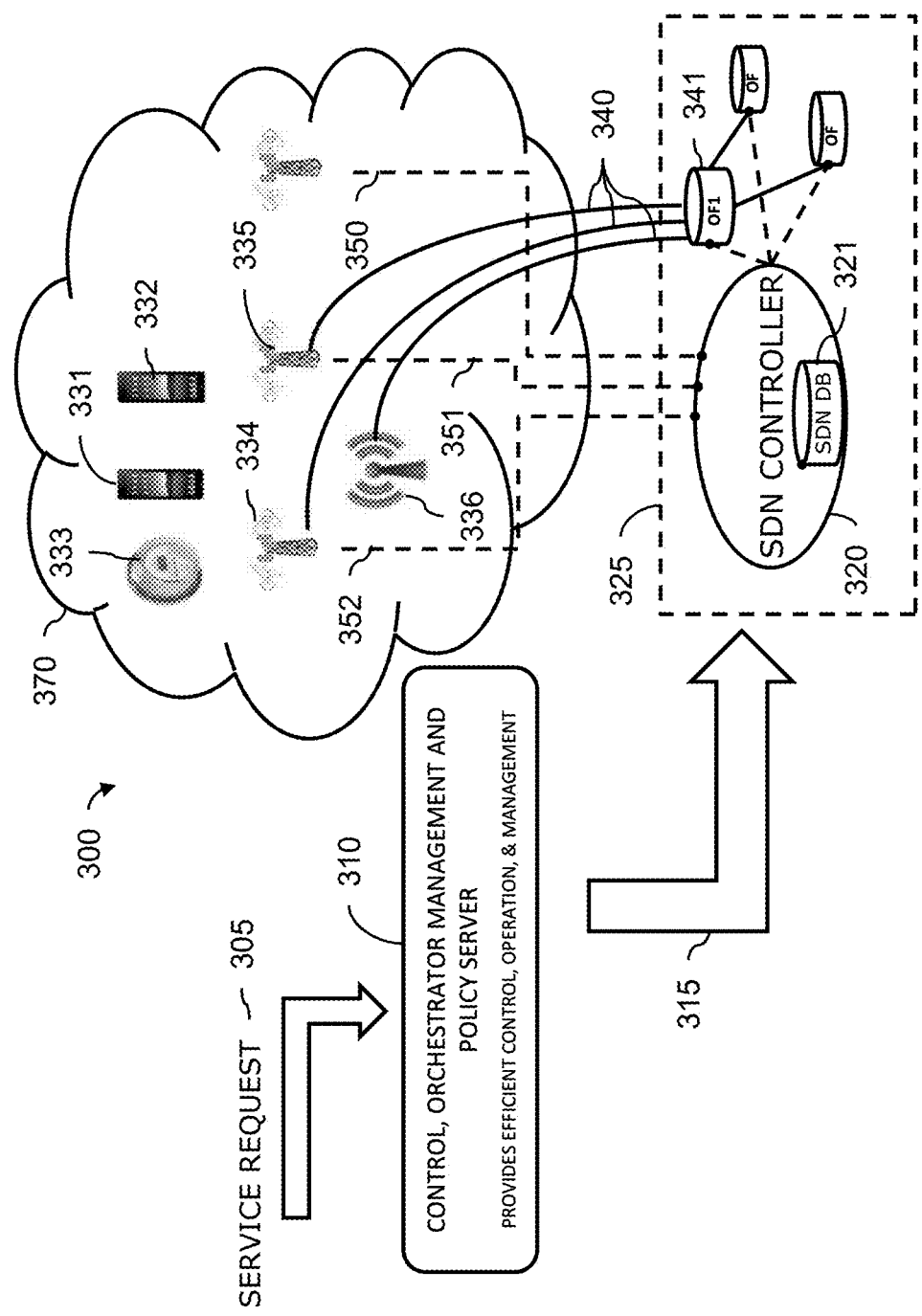
FIG. 3 is a block diagram showing a system in accordance with aspects of the present disclosure.

The disclosed system and method provide enhancement to the SDN controller with network learning capability to better make control decisions that efficiently utilize network resources in the RAN. An exemplary arrangement illustrating the solution is now described with reference to the block diagram 300 of FIG. 3.

A control, orchestrator management and policy server 310 receives a service request 305 and transmits associated service requirements 315 to a data analytics/RAN SDN controller 320 in a virtual network element 325. The SDN controller converts the service requirements 315 to bandwidth/delay requirements. The data analytics/RAN SDN controller 320 collects the per flow information regarding bandwidth, how long each session lasts, etc. The flows may each be associated with one of a variety of wireless service types in a RAN 370, such as a video flow streaming from a video content server to smart phones 331, 332 via wireless base stations 334, 335, or an automatic meter reading service utilizing an IoT utility meter 333, or a WiFi™ network utilizing a wireless access point 336. Data traffic flows in the RAN 370 take place in the transport layer using a backhaul network 340 coordinated using OpenFlow™ servers 341. Data describing the individual flows may be collected via paths 350, 351, 352 from the base stations 334, 335, and access point 336. The data collection may utilize the backhaul network 340 or may be independent of it. Similar data may also be collected from the devices (UEs) 331, 332, 333, which can potentially provide more insight on how the flows are consumed and what the user behaviors are in handling the service/application.

The collected data may be stored in an SDN database 321 for future reference and fed to the SDN controller 320, which can proactively make network resource allocation decisions to best utilize the limited RAN resources. For example, network slicing decisions may be made more dynamically based on increased knowledge of the requirements of each RAN service. The process continuously improves the SDN controller 320 by learning about each service, including learning about the resources allocated for service, user behavior for each service and dynamic changes performed for that service. That learning process helps the controller to recognize each service need and to allocate resources accordingly.

Figure 4:
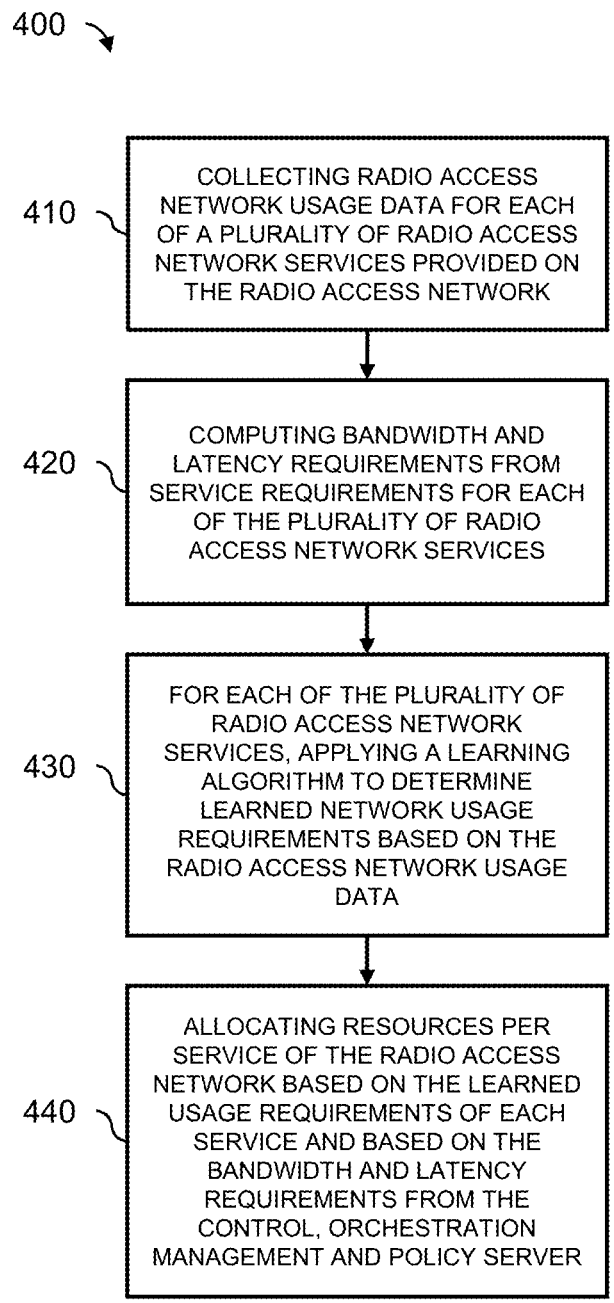
FIG. 4 is a flow diagram illustrating operations in accordance with aspects of the present disclosure.

A method for allocating resources in a radio access network using a software defined network controller, in accordance with embodiments of the disclosure, will now be discussed with reference to the block diagram 400 of FIG. 4. The method 400 may be performed by a software defined network controller with interfaces for controlling a radio access network, and for collecting data from the radio access network. The radio access network services may include, for example, voice communications services, video content delivery services and video communications services.

Radio access network usage data is collected from a core network of the RAN at operation 410 for each of a plurality of radio access network services provided on the radio access network. The radio access network usage data is on a per-flow basis for each of the plurality of radio access network services. The collected data may include bandwidth data, connection duration data and latency data for each of the radio access network services. In addition, user behavior data from user devices of the radio access network may be collected on a per-flow basis for each of the plurality of radio access network services.

Bandwidth and latency requirements for each of the plurality of radio access network services are computed at operation 420 from service requirements for each of the plurality of RAN services. The service requirements may be received from a control, orchestration management and policy server. The service requirements may be provided to the SDN controller upon receipt of an initial service request by the control, orchestration management and policy server, and provide for efficient control, operation and management of the RAN. The service requirements provided by the control, orchestration management and policy server in response to future service requests may be adjusted over time as the SDN controller learns current characteristics of each of the RAN services.

For each of the plurality of radio access network services, a learning algorithm is applied at operation 430 to determine learned network usage requirements based on the radio access network usage data. The learning algorithm may further determine learned network usage requirements based on network usage changes resulting from previous resource allocations.

The resources per service of the radio access network are allocated based on the learned usage requirements of each service and based on the bandwidth and latency requirements. Those resources may include bandwidth per service of the radio access network.

The hardware and the various network elements used in implementing the above-described technique comprise one or more processors, together with input/output capability and computer readable storage devices having computer readable instructions stored thereon that, when executed by the processors, cause the processors to perform various operations. The processors may be dedicated processors, or may be mainframe computers, desktop or laptop computers or any other device or group of devices capable of processing data. The processors are configured using software according to the present disclosure.

Each of the hardware elements also includes memory that functions as a data memory that stores data used during execution of programs in the processors, and is also used as a program work area. The memory may also function as a program memory for storing a program executed in the processors. The program may reside on any tangible, non-volatile computer-readable storage device as computer readable instructions stored thereon for execution by the processor to perform the operations.

Generally, the processors are configured with program modules that include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like, and may employ a distributed computing environment, where tasks are performed by remote processing devices that are linked through a communications network. In a distributed computing environment, modules may be located in both local and remote memory storage devices.

An exemplary processing module for implementing the methodology above may be stored in a separate memory that is read into a main memory of a processor or a plurality of processors from a computer readable storage device such as a ROM or other type of hard magnetic drive, optical storage, tape or flash memory. In the case of a program stored in a memory media, execution of sequences of instructions in the module causes the processor to perform the process operations described herein. The embodiments of the present disclosure are not limited to any specific combination of hardware and software.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. The terms "tangible media" and "non-transitory media" each exclude transitory signals such as propagated signals, which are not tangible and are not non-transitory. Cached information is considered to be stored on a computer-readable medium. Common expedients of computer-readable media are well-known in the art and need not be described in detail here.

The presently disclosed technique implements an SDN learning capability in which the SDN controller continuously learns about each service and the network resources allocated to each service flow and the dynamic changes that must be made for that service. That learning process enables the controller to recognize each service need, to leverage the learned network and service behavior for more intelligent network control and to allocate resources accordingly. The presently described improvements to a RAN SDN controller therefore provide a more intelligent network control and allocation of radio resources, an improvement of network efficiency and the ability to meet a greater variety of network service requirements.

The forgoing detailed description is to be understood as being in every respect illustrative and exemplary, but not restrictive, and the scope of the disclosure herein is not to be determined from the description, but rather from the claims as interpreted according to the full breadth permitted by the patent laws. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. It is to be understood that various modifications will be implemented by those skilled in the art, without departing from the scope and spirit of the disclosure.

What is claimed is:

1. A software defined network controller, comprising:
   a database store comprising bandwidth usage data, connection duration usage data and latency usage data, wherein each of the bandwidth usage data, connection duration usage data and latency usage data is collected on a per-flow basis for each of a plurality of radio access network services provided on a radio access network;
   a processor configured to perform an intelligent data collection function including collecting the bandwidth usage data, connection duration usage data and latency usage data on a per-flow basis for each of the plurality of radio access network services, and storing the bandwidth usage data, connection duration usage data and latency usage data in the database store; and
   a network resource allocation engine comprising an interface with the database store, a processor and at least one memory device storing computer readable instructions that, when executed by the processor, cause the processor to execute operations comprising:
      receiving, from the intelligent data collection function, the bandwidth usage data, connection duration usage data and latency usage data;
      for each of the plurality of radio access network services, applying to the bandwidth usage data, connection duration usage data and latency usage data, a learning algorithm to determine, for each of the radio access network services individually, learned network characteristics of the radio access network service, including network usage changes resulting from previous resource allocations;
      recognizing a service need for a requested radio access network service of radio access network services, the recognizing being based on the learned network characteristics of the requested radio access network service; and
      allocating resources for the requested radio access network service based on the learned network characteristics of the requested radio access network service and based on bandwidth and latency requirements computed from service requirements of the requested radio access network service.

2. The software defined network controller of claim 1, wherein the operations further comprise:
   receiving the service requirements from a control, orchestration management and policy server.

3. The software defined network controller of claim 1, wherein the radio access network services comprise at least voice communications services, video content delivery services and video communications services.

4. The software defined network controller of claim 1, wherein the bandwidth usage data, connection duration usage data and latency usage data is collected via a backhaul network from user devices of the radio access network.

5. The software defined network controller of claim 1, wherein the bandwidth usage data, connection duration usage data and latency usage data is collected independently of a backhaul network of the radio access network.

6. The software defined network controller of claim 1, wherein the learned network characteristics of the radio access network service further include current trends in streaming and traffic patterns, bandwidth and latency requirements and preferred codec.

7. The software defined network controller of claim 1, wherein the allocating resources comprises allocating bandwidth per service of the radio access network.

8. A method for allocating resources in a radio access network using a software defined network controller, comprising:
   collecting bandwidth usage data, connection duration usage data and latency usage data for each of a plurality of radio access network services provided on the radio access network, the bandwidth usage data, connection duration usage data and latency usage data being collected on a per-flow basis for each of the plurality of radio access network services;
   computing bandwidth and latency requirements from service requirements for a requested radio access network service of the plurality of radio access network services;
   for each of the plurality of radio access network services, applying to the bandwidth usage data, connection duration usage data and latency usage data, a learning algorithm to determine, for each of the radio access network services individually, learned network characteristics of the radio access network service, including network usage changes resulting from previous resource allocations;
   recognizing a service need for the requested radio access network service, the recognizing being based on the learned network characteristics of the requested radio access network service; and
   allocating resources for the requested radio access network service based on the learned network characteristics of the requested radio access network service and based on the bandwidth and latency requirements.

9. The method of claim 8, further comprising:
   receiving the service requirements from a control, orchestration management and policy server.

10. The method of claim 8, wherein the radio access network services comprise at least voice communications services, video content delivery services and video communications services.

11. The method of claim 8, wherein the bandwidth usage data, connection duration usage data and latency usage data is collected via a backhaul network from user devices of the radio access network.

12. The method of claim 8, wherein the bandwidth usage data, connection duration usage data and latency usage data is collected independently of a backhaul network of the radio access network.

13. The method of claim 8, wherein the learned network characteristics of the radio access network service further include current trends in streaming and traffic patterns, bandwidth and latency requirements and preferred codec.

14. The method of claim 8, wherein the allocating resources comprises allocating bandwidth per service of the radio access network.

15. A computer-readable storage device having stored thereon computer readable instructions for allocating resources in a radio access network using a software defined network controller, wherein execution of the computer readable instructions by a processor causes the processor to perform operations comprising:
- collecting bandwidth usage data, connection duration usage data and latency usage data for each of a plurality of radio access network services provided on the radio access network, the bandwidth usage data, connection duration usage data and latency usage data being collected on a per-flow basis for each of the plurality of radio access network services;
- receiving service requirements from a control, orchestration management and policy server;
- computing bandwidth and latency requirements from service requirements for a requested radio access network service of the plurality of radio access network services;
- for each of the plurality of radio access network services, applying to the bandwidth usage data, connection duration usage data and latency usage data, a learning algorithm to determine, for each of the radio access network services individually, learned network characteristics of the radio access network service, including network usage changes resulting from previous resource allocations;
- recognizing a service need for the requested radio access network service, the recognizing being based on the learned network characteristics of the requested radio access network service; and
- allocating resources for the requested radio access network service based on the learned network characteristics of the requested radio access network service and based on the bandwidth and latency requirements.

16. The computer-readable storage device of claim 15, wherein the radio access network services comprise at least voice communications services, video content delivery services and video communications services.

17. The computer-readable storage device of claim 15, wherein the bandwidth usage data, connection duration usage data and latency usage data is collected via a backhaul network from user devices of the radio access network.

18. The computer-readable storage device of claim 15, wherein the bandwidth usage data, connection duration usage data and latency usage data is collected independently of a backhaul network of the radio access network.

19. The computer-readable storage device of claim 15, wherein the learned network characteristics of the radio access network service further include current trends in streaming and traffic patterns, bandwidth and latency requirements and preferred codec.

20. The computer-readable storage device of claim 15, wherein the allocating resources comprises allocating bandwidth per service of the radio access network.

\* \* \* \* \*